US008145576B2

(12) United States Patent
Tropp

(10) Patent No.: US 8,145,576 B2
(45) Date of Patent: *Mar. 27, 2012

(54) METHOD OF FACILITATING SCREENING OF AIRLINE LUGGAGE

(75) Inventor: David Tropp, Brooklyn, NY (US)

(73) Assignee: Iowa Hawkeyes LLC, Brooklyn, NY (US)

( * ) Notice: Subject to any disclaimer, the term of this patent is extended or adjusted under 35 U.S.C. 154(b) by 701 days.

This patent is subject to a terminal disclaimer.

(21) Appl. No.: 10/756,531

(22) Filed: Jan. 12, 2004

(65) Prior Publication Data

US 2005/0154605 A1    Jul. 14, 2005
US 2010/0153123 A9    Jun. 17, 2010

Related U.S. Application Data

(63) Continuation-in-part of application No. 10/706,500, filed on Nov. 12, 2003, now Pat. No. 7,021,537.

(51) Int. Cl.
G06Q 99/00 (2006.01)
E05B 37/00 (2006.01)
B65D 27/30 (2006.01)

(52) U.S. Cl. .................. 705/325; 70/22; 70/25; 292/315

(58) Field of Classification Search .............. 705/1, 317, 705/325; 70/460, 21, 22, 25, 58, 69; 340/5.64; 235/384; 292/315, 328

See application file for complete search history.

(56) References Cited

U.S. PATENT DOCUMENTS

| 2,049,416 | A | * | 8/1936 | Aldeen | 70/21 |
| 2,115,042 | A | * | 4/1938 | Olson | 70/21 |
| 3,952,559 | A | | 4/1976 | Atkinson | |
| 4,055,972 | A | | 11/1977 | Calegan | |
| 4,137,567 | A | | 1/1979 | Grube | 364/567 |
| 4,249,469 | A | | 2/1981 | Craske | |
| 4,499,745 | A | | 2/1985 | Ricouard et al. | 70/285 |

(Continued)

FOREIGN PATENT DOCUMENTS

EP    0414165    2/1991

(Continued)

OTHER PUBLICATIONS

Travel Sentry (www.travelsentry.org) as archived by www.archive.org, on Sep. 20, 2003.*

(Continued)

*Primary Examiner* — Jami A Plucinski
*Assistant Examiner* — Bob R. Chumpitaz
(74) *Attorney, Agent, or Firm* — Cooper & Dunham, LLP

(57) ABSTRACT

Method of making airline luggage inspection secure while accommodating the needs of the traveler comprises making a special lock available to airline travelers, the special lock having a combination lock portion and a master key lock, the master key lock portion receiving a master key that can open the master key lock portion of any special lock of this type. The special lock is designed to be applied to an individual piece of airline luggage and has indicia conveying to luggage purchasers that the special lock is "approved" by a luggage screening authority and conveying to the luggage screening authority that the special lock can be opened using the master key. The method includes providing the luggage screening authority directly or indirectly with exclusive access to the master key. The manufacturers and/or provider of the master key and special lock retain copies of the master key.

6 Claims, 2 Drawing Sheets

U.S. PATENT DOCUMENTS

| | | | |
|---|---|---|---|
| 4,557,122 A | 12/1985 | Hwang | 70/312 |
| 4,671,088 A | 6/1987 | Jeang | 70/312 |
| 4,751,830 A | 6/1988 | Cheng | |
| 4,770,013 A | 9/1988 | Nakai | 70/285 |
| 4,838,052 A | 6/1989 | Williams et al. | |
| 4,866,958 A | 9/1989 | Bretl | |
| 4,885,923 A | 12/1989 | Nakai | 70/284 |
| 4,952,228 A | 8/1990 | Taylor | |
| 5,089,692 A | 2/1992 | Tonnesson | 235/382.5 |
| 5,134,869 A | 8/1992 | Gable | |
| 5,237,842 A * | 8/1993 | Rasch et al. | 70/285 |
| 5,274,356 A | 12/1993 | Taricco | 340/515 |
| 5,345,798 A | 9/1994 | Nakai | 70/284 |
| 5,485,734 A | 1/1996 | Yang | 70/285 |
| 5,507,161 A | 4/1996 | Broekaert et al. | 70/71 |
| 5,582,049 A | 12/1996 | Mauer | 70/312 |
| 5,737,947 A | 4/1998 | Ling | |
| 6,000,258 A * | 12/1999 | Lesko | 70/460 |
| 6,173,592 B1 | 1/2001 | Yu | 70/69 |
| 6,212,920 B1 | 4/2001 | Winner | |
| 6,508,089 B1 | 1/2003 | Tsai | 70/213 |
| 6,513,356 B1 | 2/2003 | Yang | 70/213 |
| 6,522,253 B1 | 2/2003 | Saltus | |
| 6,557,384 B1 | 5/2003 | Cuesta | |
| 6,568,225 B1 | 5/2003 | Chang | 70/69 |
| 6,598,434 B2 | 7/2003 | Yang | 70/213 |
| 6,886,378 B1 * | 5/2005 | Harris et al. | 70/129 |
| 7,159,422 B1 * | 1/2007 | Misner et al. | 70/21 |
| 7,236,085 B1 * | 6/2007 | Aronson et al. | 340/5.64 |
| 2002/0129628 A1 | 9/2002 | Skalberg | 70/18 |
| 2002/0139155 A1 | 10/2002 | Franzen | 70/213 |
| 2002/0198731 A1 | 12/2002 | Barnes et al. | 705/1 |
| 2003/0089147 A1 | 5/2003 | Yang | 70/284 |
| 2004/0226324 A1 | 11/2004 | Loughlin et al. | |
| 2004/0246096 A1 | 12/2004 | Queenan | |
| 2005/0081584 A1 | 4/2005 | Nugent | |
| 2005/0092036 A1 | 5/2005 | Lai | |
| 2005/0111618 A1 | 5/2005 | Sommer et al. | |
| 2006/0150690 A1 | 7/2006 | Lai et al. | |

FOREIGN PATENT DOCUMENTS

| | | | |
|---|---|---|---|
| EP | 1529907 A2 | 5/2005 | |
| FR | 2686493 | 7/1993 | |
| WO | WO03/003144 A2 | 1/2003 | |
| WO | WO2004/104329 A2 | 12/2004 | |
| WO | WO2004/113651 A2 | 12/2004 | |

OTHER PUBLICATIONS

Master Lock (www.masterlock.com) as archived on Feb. 9, 1999.*
Master Lock Padlocks, Combination Locks and Backpack locks (www.masterlock.com) as archived on Apr. 15, 2000 and Jul. 1, 2001. pp. 1-3.*
MasterLock (www.MasterLock.com).*
FlyerTalk (www.flyertalk.com).*
TwinsList (www.twinslist.org).*
Dicks Sporting Goods (www.dickssportinggoods.com).*
Article "Making Up for the Blackout" by Audrey Warren, The Wall Street Journal, Aug. 20, 2003.
Jeffrey Leib, The Denver Post Knight Ridder/Tribune Business News, Dec. 19, 2002.
CCL Security Products News Release, Nov. 12, 2003.
Brookstone Press Release, Brookstone Launches New Federally Recognized Travel Sentry Certified Luggage Locks, Nov. 12, 2003.
Travel Sentry Press Release, Nov. 12, 2003, New System Will Allow TSA to Open Locked Bags.
The Eastern Company Reports Results for the 1st Quarter 2004 and 3rd Quarter 2003.
Samsonite™ Press Release, Nov. 12, 2003, Portside™ Samsonite's™ New Lightweight Hardside.
The Travel Insider, Nov. 26, 2003.
Travel Sentry™ Certified Locks by Austin House.
Search Alert Classic.
Transportation Security Administration Accepted and Recognized Locks.
TSA Under Pressure to Stop Baggage Theft, Sara K. Goo, Washington Post, Jun. 29, 2003.
Be Prepared for Hand Searches of Luggage, Los Angeles Times, J. Engle, Apr. 13, 2003.
CNN.com, Paris Airport Arms Find: Man Held, Dec. 30, 2002.
Fliers Flood TSA with Inspection Gripes, USA Today, B. De Lollos, Jul. 21, 2003.
Even How You Secure Luggage Has Changed, USA Today, B. De Lollis, Aug. 1, 2003.
Getting Back the Business, Travel Goods Showcase Magazine, Jul./Aug. 2003.
Jeffrey Leib, Luggage Industry Struggles to Adapt to No-Lock Air-Security Rules, The Denver Post Knight Ridder/Tribune Busness News, Jan. 13, 2003.
Replacement Request for ExParte ReExamination of U.S. Patent 7,021,537 dated Dec. 10, 2010.
Replacement Request for ExParte ReExamination of U.S. Patent 7,036,728 dated Dec. 10, 2010.
Flyer Talk Internet Publication Dated Feb. 5, 2002.
Child Seat Internet Publications dated Dec. 1999-Jan. 31, 2002.
MCMaster-Carr Supply Co. Catalog 106 p. 2593, 2600 Copyright 2000.
CNN.com Transcript dated Aug. 22, 2002.
U.S. Government Commercial Item Description A-A 59486A For Padlock Set Dated Jul. 3, 2001.
*Travel Sentry, Inc.* v. *David A. Tropp*—Notice of Appeal dated Oct. 6, 2010.
*Lock Concept*, by J. Vermilye (Jan. 13, 2003).
*Lock Sentry Concept*, by J. Vermilye (Jan. 17, 2003).
Collection of documents from Transportation Security Administration: *Checked Baggage Screening* bates labeled TSA000001-176, including TSA000114-115 dated Dec. 30, 2002, TSA 000166 dated Feb. 10, 2003, TSA 000167 dated Feb. 6, 2003, TSA 000168-170 dated Jan. 3, 2003, TSA 000171 dated May 23, 2003, TSA 000172-173 dated May 14, 2003, and TSA 000174-176 dated Jan. 3, 2003.
J. Vermilye titled *Checked Baggage Screeing Issues, Plan of Attach, Briefing for Industry TSA Checked Baggage Customer Service*, bates labeled TS 000114-118.
*Introduction to Travel Sentry* bates labeled TS 000138-148, Mar. 27, 2003.
*Travel Sentry launches partnership with the Travel Goods Association(TGA)* dated Mar. 26, 2003, bates labeled TS 003328.
Audrey Warren, *Travel Watch: Making Up for the Blackout*, Wall St. J., Aug. 20, 2003.
Master Locker Locks-Exh 33.
The New Dual Access Lock the Only Set-Your-own-Combination Lock with Key override, and hand-written exhibit 7 dated Jun. 5, 2007.
Logibag The "new generation" left luggage locker.
Logibag Information.
Logibag L120 User's and Maintenance Manual-Mors Technologies Inc., including Figs. dated May 5, 1992.
Samsonite Lock Information.
Samsonite-*Our Strengths Are Legendary* 1992.
Samsonite catalog.
Memorandum of Understanding Agreement Between the Transportation Security Administration and Travel Sentry Regarding Travel Sentry Certified Locks Oct. 16, 2003.
Checked Baggage Implementation Guide, Dec. 23, 2002.
Baggage Screening, Dec. 20, 2002.
Index of Implementation Package, Dec. 23, 2002.
Hand sketch dated Jan. 10, 2003.
Need for a system, Dec. 19, 2002.
Notice of Intent to Issue Ex Parte Reexamination Certificate mailed Mar. 11, 2011 in Reexamination 90/011,044.
Order Granting Request for Ex-Parte Re-examination mailed Feb. 14, 2011 in Reexamination 90/011,312.
Apr. 15, 2011 European search report in connection with counterpart European patent application No. 04 80 9332.

* cited by examiner

DIALS

MASTER KEY

DIAL TURN

METHOD OF FACILITATING SCREENING OF AIRLINE LUGGAGE

PRIORITY INFORMATION

This patent application claims priority from and is a continuation-in-part patent application of U.S. patent application Ser. No. 10/706,500 previously filed by Applicant and Inventor David Tropp on Nov. 12, 2003 which became U.S. Pat. No. 7,021,537.

FIELD OF THE INVENTION

The field of this invention is methods of improving airline luggage inspection, and more particularly, methods of making such inspection less intrusive and more secure.

BACKGROUND OF THE INVENTION AND DISCUSSION OF THE PRIOR ART

Due to the threat of terrorism, in the weeks prior to Jan. 1, 2003, the Transportation Security Administration ("TSA"), a division of the United States Department of Homeland Security, announced that with respect to luggage at United States airports if a TSA baggage screener was unable to open a traveler's bag for inspection because the bag was locked, the screener would have to break the locks on the traveler's bag. Hence, passengers should leave their bags unlocked, according to the TSA. Beginning Jan. 1, 2003 the TSA's federal workers started screening luggage at U.S. airports and when it deemed it necessary it started clipping locks on this luggage in order to open and inspect the luggage.

Since by definition airport luggage screening occurs outside the presence of the passengers whose luggage is being inspected, it is impossible or at least impractical for airport luggage screening personnel to make use of combinations to open combination locks on airport luggage. Nonetheless, passengers may desire to use combination locks to avoid worrying about loss of a key or finding the key.

Although arguably necessary for security, the method of screening luggage that includes opening the passenger's luggage in a manner that leaves the luggage "unlockable" after the inspection process, for example by clipping the heretofore workable lock, suffers from several drawbacks. First, the passenger's belongings have been damaged either because the lock has been clipped or because the luggage has been opened forcibly or both. This causes monetary damage, it also causes aggravation. Second, a new security hazard is generated since the passenger gets back a piece of luggage with a broken or removed lock. This means that during the remainder of the passenger's trip his or her luggage is not secure and can be tampered with. The remainder of the trip may even include further domestic flights. Furthermore, if travelers consistently have their locks broken, travelers will see no value in using locks when traveling, thereby exposing their unlocked luggage to a constant risk of tampering.

One should not assume that security risks exist only among passengers. Terrorists have tried in the past and may try in the future to compromise the workers at the airports who inspect luggage. Accordingly, the no longer secure piece of luggage is subject to the risk that a terrorist or other dangerous person who is within the area of the airport luggage screening personnel—because he is a worker or because he penetrated the secure area—can insert a bomb or other hazardous material into the luggage by easily opening it since it not only does not have a lock anymore but its outward appearance, i.e. a damaged lock, may advertise that it has been tampered with and be easily opened.

Furthermore, the sale of padlocks plummeted after the TSA began the practice of clipping locks. Another thing that happened was that the number of claims for theft and damage allegedly caused, by the government and/or airline personnel to passengers' luggage increased significantly since Jan. 1, 2003.

Another problem is that passengers are concerned about theft of the contents of their bags without the protection of locks (after their locks have been rendered useless by the luggage screening authorities)

Travelers understand and support the federal government's initiatives to thwart terrorism. This support of security regulations and procedures on the part of travelers is critical to their implementation and success. However, travelers, just getting accustomed to the new security laws, may have legitimate concerns about baggage inspections. It is crucial that the government or appropriate authorities act to diminish travelers' concerns in this regard.

In addition, working as a TSA luggage screener is a highly demanding and stressful job. Therefore, anything that reduces the physical strain would be highly appreciated by the screeners.

It should be born in mind that the number of airline travelers who pass through airports in the United States in a given year is close to half a billion. Thus, these concerns affect a great many individuals.

Accordingly, there is a compelling and immediate need for a method of inspecting luggage at airports that does not create a security risk and that is not damaging or aggravating to the passengers.

SUMMARY OF THE PRESENT INVENTION

The present invention presents a method of making airline luggage inspection secure while accommodating the needs of the traveler includes a first step of making a special lock available to airline travelers, the special lock having a combination lock portion and a master key lock, the master key lock portion for receiving a master key that can open the master key lock portion of any special lock of this type. The special lock is designed to be applied to an individual piece of airline luggage and has an indicia thereon conveying to luggage purchasers that the special lock is "approved" by a luggage screening authority and conveying to the luggage screening authority that the special lock can be opened using the master key. Then providing the luggage screening authority with exclusive access to the master key. The manufacturers and/or providers of the master key and special lock retain copies of the master key. In accordance with the method of the present invention, therefore, the luggage screening authority need not clip or otherwise break open locks to inspect luggage, nor do they have to break into the luggage in some other manner. The workers need only be told that master keys are available to open locks that have the indicia on them.

IMPORTANT OBJECTS AND ADVANTAGES

The following important objects and advantages of the present invention are:

(1) to provide a method of screening luggage at airports that avoids forcible opening of the luggage;

(2) to provide a method of screening luggage at airports that employs special locks that remain viable after being subjected to airport luggage screening and inspection;

(3) to provide a method of non-intrusively searching passenger's luggage at airports;

(4) to provide a method of screening luggage that uses a master key exclusively maintained by the luggage screening authority;

(5) to provide a method of improving luggage screening at airports that avoids the need for clipping the locks on passenger luggage;

(6) to provide a method of screening luggage at airports that eliminates a potential security threat of tampering with broken-into luggage or luggage whose locks have been broken;

(7) to provide a method of luggage screening that reduces the costs of the luggage screening authority;

(8) to provide a method of luggage screening that eliminates the need for lock clippers;

(9) to provide a luggage screening method that reduces injuries to luggage screeners that may arise from clipping locks;

(10) to provide an improved method of luggage screening at airports that requires essentially no new training;

(11) to provide a method of airport luggage screening that reduces the liability to the luggage screening authority;

(12) to provide an improved method of luggage screening that would not interfere with current policy of the luggage screening authority in that luggage locks could still be clipped if they did not display the indicia conveying that were "TSA approved" or authorized;

(13) to provide a luggage screening method that decreases the labor of luggage screeners in that opening the special lock of the method of the present invention requires less manual labor than breaking locks;

(14) to provide a method of luggage screening that provides a public relations benefit to the TSA or luggage screening authority in that travelers will appreciate the TSA or luggage screening authority's concern for their personal property, an important benefit for new agency;

(15) to provide a method of airport luggage screening that allows the luggage screening authority to get its work done more efficiently;

(16) to provide a method of airport luggage screening that allows a thorough search of the passenger's luggage while at the same time providing a less intrusive and more comfortable search to the passenger;

(17) to provide a method of screening luggage at airports that eliminates the danger of tampering with luggage that has been broken into subsequent to the screening process; and

(18) to provide a method that eliminates the need to break into the luggage at a point other than its lock.

DETAILED DESCRIPTION OF THE PREFERRED EMBODIMENT

Figure 1:
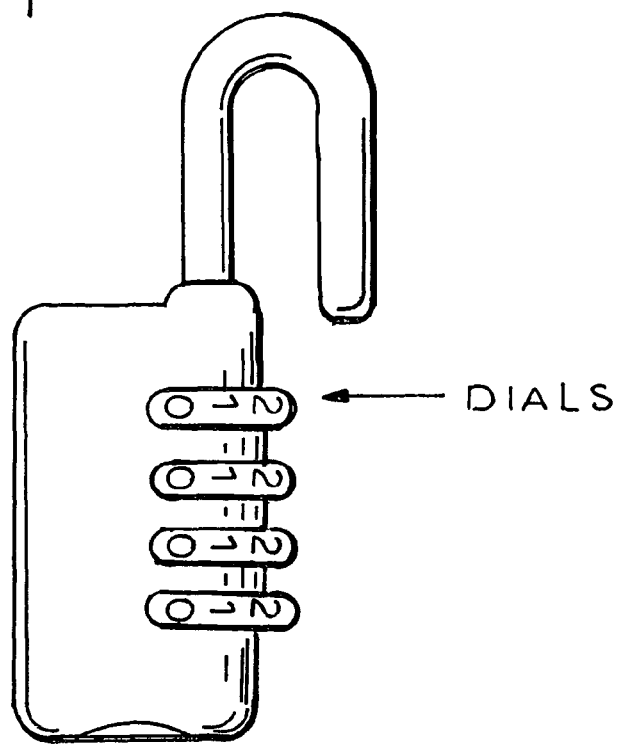
FIG. 1 is a front plan view of one embodiment of the special lock used in the method of the present invention in open position modified to show a key hole for a master key on the bottom.

The method of the present invention includes the step of making a special lock available to airline travelers, the special lock having a combination lock portion and having a master key lock, the master key lock portion for receiving a master key that can open the master key lock portion of any special lock of this type, the special lock designed to be applied to an individual piece of airline luggage. The special lock also has indicia thereon conveying to luggage purchasers and to the luggage screening authority that the special lock is a lock that the luggage screening authority has agreed not to break. The indicia can state, for example, that the special lock is "approved", "accepted" or "authorized" by the luggage screening authority. The term "indicia" is a broad term and can include the special lock having a distinctive physical characteristic such shape, texture, weight and/or other characteristic that makes it instantly recognizable by individuals working for the luggage screening authority who are specifically for that characteristic. Alternatively, a distinctive chemical or electronic characteristic can be used—in short any distinctive characteristic that can be instantly recognized by persons looking for it.

The phrase "any special lock of this type" is intended to include special locks having a multiplicity of sub-types such as different sizes, different manufacturing designs or styles, etc.

Besides making the special lock more valuable to prospective luggage purchasers or lock purchasers, such indicia also tells the luggage screening authority that the special lock can be opened by the luggage screening authority using the master key and that the special lock is among those locks that the luggage screening authority agrees not to break in order to inspect the luggage. The phrase "approved", "accepted" or "authorized" is a broad phrase intended to include other words or terms that signify that the luggage screening authority agrees that locks having such indicia will not be broken into.

The method of the present invention also includes the step of providing the luggage screening authority, directly or indirectly, with access to the master key. This step includes providing such access with the help of or in conjunction with another business entity, i.e. a third party. The access is to be exclusive except that one or more of the following entities may retain copies of the master key: the manufacturer of the special lock, since it may need to retool the special lock, the provider to the passengers of the special lock, which may or may not be the same as the manufacturers, the manufacturer and/or the provider of the master key to the luggage screening authority. It is anticipated that the manufacturer of the special lock will also provide the master key but other possibilities are also contemplated by the present invention.

The step of providing access may be accomplished by delivering one or more master keys to the luggage screening authority or by delivering one or master keys to a company or organization whose responsibility it is to cause said one or more master keys to be delivered to the luggage screening authority.

Access to the master key by the luggage screening authority includes having access to any appropriate number of such master keys by its workers or by any appropriate division of part of said luggage screening authority.

Although the present invention is a method of improving the inspection of airline luggage, the method of the present invention makes use of an apparatus. This apparatus is a special lock. The special lock is illustrated by reference to the accompanying drawings. Consequently, the special lock used in the method of the present invention has been assigned reference numeral 10 Other elements have been assigned the reference numerals referred to below.

Combination locks have certain advantages over locks with keys. For one thing, there is no need to fear loss of the key. Hence, it is advantageous to have combination locks on luggage used to fly with since flights tend to cause stress and stress can lead to loss of the key. Second, even if one has the key it takes time to retrieve it. If the luggage has to be opened suddenly then retrieval of the key is an inconvenience. Although combination locks require memorization of access to the coded combination, this is usually considered better than a key lock on balance to many passengers. Hence, there is a need for a method of improving luggage screening at airports that makes of a special lock that includes a unique combination but that is nonetheless convenient and secure for the passengers and for the airport luggage screening personnel.

As seen from FIGS. 1-4, special lock 10 includes a combination lock portion 20 having a unique combination and a master key lock. The master key lock portion is opened by a master key that is inserted in key hole 30. Typically, although not necessarily, the key hole would be inconspicuously placed on the bottom of the special lock 10. The combination lock portion can be any kind of combination lock portion suitable for use with a piece of luggage at an airport. The combination can be a front dial that is turned or several dials that are turned to set the combination.

Presently, the Transportation Security Administration, a division of the United States Department of Homeland Security has the task of screening travelers' luggage at airports. However, the term "luggage screening authority" is intended broadly to encompass both the Transportation Security Administration and any governmental entity or non-governmental organization whose task includes screening the luggage of travelers at airports in the United States or a non-governmental organization. Alternatively, the luggage screening authority can be a governmental entity or non-governmental organization whose task includes screening the luggage of travelers at airports in Canada or another country. Furthermore, the luggage screening authority is also intended to broadly include individual workers who screen luggage at airports and other personnel of the TSA or of some other entity or organization whose task it is to screen such luggage.

Thus, the master key allows the authorized agency's workers to have the ability to open any of the luggage that the workers inspect in a manner without clipping the lock. The indicia notifies the luggage screening authority which pieces of luggage has locks that lock the master key opens and it notifying purchasers of the special lock of an added value of the special lock. Market research exists to support the fact that customers will spend significantly more on luggage if they know that it comes with a lock that the luggage screening authorities such as the TSA recognize as being openable by their master key and without forcibly opening the luggage.

Figure 2:
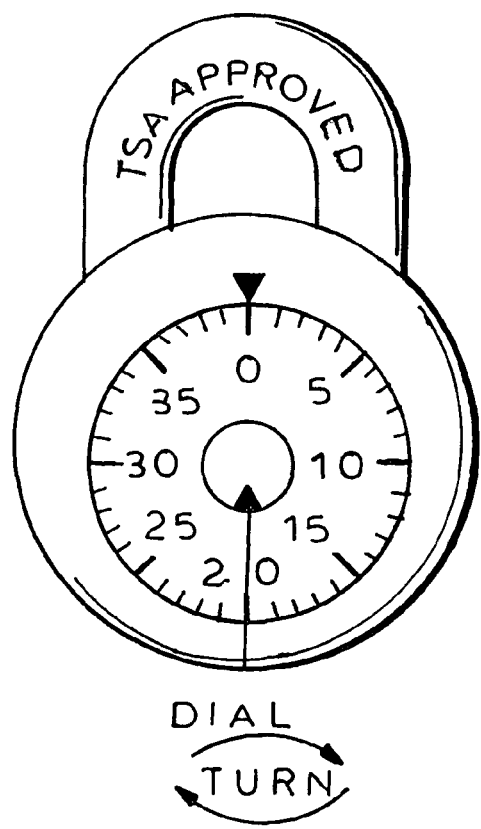
FIG. 2 is a front plan view of a second embodiment of the special lock used in the method of the present invention.
Figure 3:
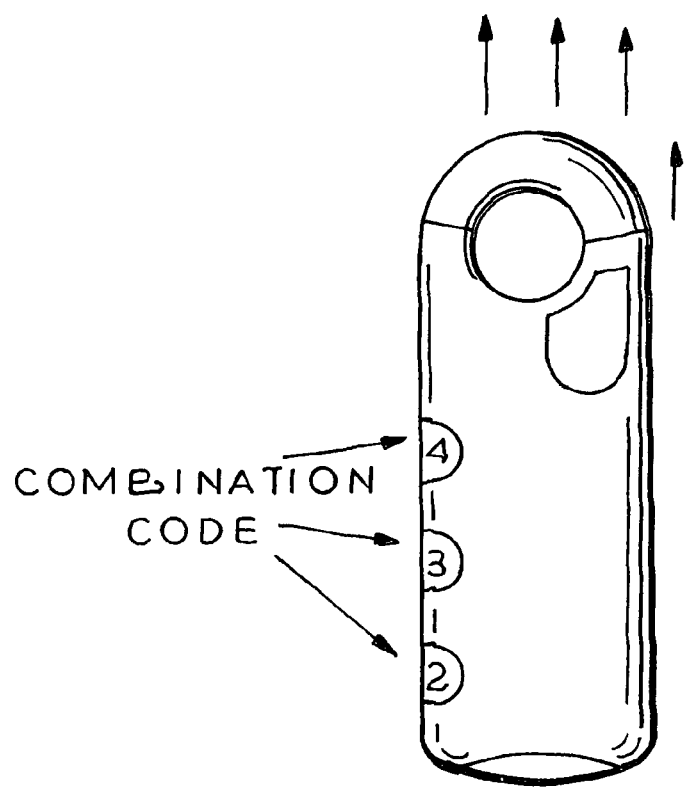
FIG. 3 is a front plan view of a second embodiment of the special lock used in the method of the present invention modified to show a key hole for a master key on the bottom.
Figure 4:
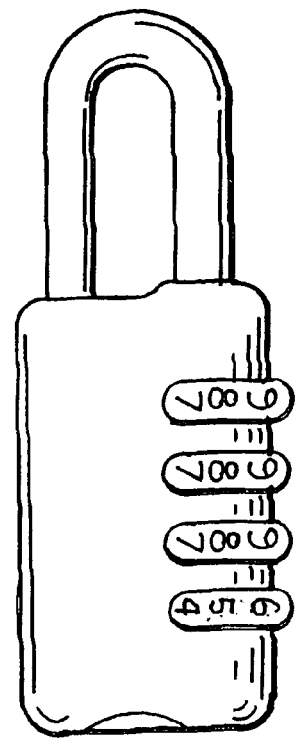
FIG. 4 shows the special lock depicted in FIG. 1 in closed position.

As seen in FIG. 2, the indicia 50 can take the form of a phrase "approved by the TSA" or any similar phrase or it can be anything else that conveys the approval, authority, acceptance etc. by the TSA or other relevant luggage screening authority. It should be understood that although one example of the indicia appears in FIG. 2 only, the other embodiments of the special lock used in the method of the present invention would also have the indicia.

It should be noted that with the use of the special lock by the traveler, the traveler still selects a combination for the combination lock portion of the special lock 10 and the traveler has that combination for the combination lock portion part of the special lock. Accordingly, the traveler still has a useful secure lock after passing airport security. In addition, the luggage screening authority still maintains an effective and quick way of accessing airport luggage for inspection whenever it deems doing so necessary.

It should be noted that the terms "master key" and "master key lock portion" are broad terms intended to also include electronic or other sensor mechanisms for opening up the master key lock portion in special lock 10. Thus, the method of the present invention contemplates using in certain embodiments a special lock 10 that makes use of an electronic sensor instead of a traditional physical key even though such a traditional physical key is what is typically understood by the term "master key". In such a case the locking mechanism inside special lock 10 would not be a traditional master key lock mechanism but rather would be a locking mechanism that is opened by an electronic sensor.

The present invention also contemplates that in certain embodiments other lock mechanisms besides a traditional combination lock can be used as one of the locks in special lock 10. Hence, in an alternative embodiment, the method would employ a first lock portion instead of a combination lock portion in special lock 10. The first lock portion can be any kind of locking mechanism useful for and easily accessible by the passenger.

It is to be understood that while the method of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A method of improving security of luggage of airline travelers through the use of a class of locks with which airline travelers can secure their luggage, said class comprising a multiplicity of special locks that differ from each other but a luggage screening authority for airline luggage can open and re-lock with a single configuration of a master key without cutting the lock, said multiplicity of special locks including sub-types having different sizes, different manufacturing designs and styles, and different methods of locking and unlocking by airline travelers, said special locks including first portions configured to be locked and unlocked by air travelers and second portion configured to be unlocked by the luggage screening authority with the master key to thereby open the special locks without cutting or breaking them, said method comprising:
   (a) entering into an agreement with the luggage screening authority that the authority will maintain the master key to unlock the special locks therewith during luggage screening of said luggage, using said master key to unlock the second portions of said special locks and thus the special locks;
   (b) causing a class of special locks for a luggage to be provided to airline travelers;
   (c) wherein:
      (i) said class of special locks includes locks that differ from each other in size, manufacturing design and style, and method of locking and unlocking by the airline travelers;
      (ii) each of the locks in said class of special locks comprises special indicia configured to remain a part of the lock while the lock is securing said luggage, and to remain visible and conspicuous even when the first portion of the lock is and remains locked to secure the luggage;

(iii) said indicia (1) conveying to the luggage screening authority that the lock is in said class of special locks that the luggage screening authority would open and re-lock for screening luggage without cutting the lock, and (2) conveying to air travelers that the lock is in said class of locks that the screening authority would open and re-lock without cutting the lock;

(iv) said special indicia are in addition to any name on the lock of a manufacturer or a seller of the lock;

(v) each of the locks in said class of special locks comprises at least one of said first lock portions, each first lock portion being operable multiple times by an airline traveler to lock the traveler's luggage with the lock and thereafter to open the lock;

(vi) the first lock portions including combination locks and as well as locks with other lock mechanisms within said class of special locks; and (vii) each lock in said class of special locks further comprises at least one of said second lock portions, each second lock portion being operable by the screening authority but not the air traveler to repeatedly open and re-lock the lock without cutting the lock even when the first portion of the lock is and remains locked;

(d) supplying, in response to entering into an agreement the luggage screening authority with at least one master key configured to open each lock of said multiplicity of special locks including said sub-type having different sizes, different manufacturing designs and styles, and different methods of locking and unlocking by airline travelers;

(e) said at least one master key being configured to repeatedly open and re-lock each of a plurality of the locks in said class of locks while the first portion of the lock is and remains locked when the screening authority subjects the travelers' luggage to said special screening procedure; and (f) said master key configuration being associated with said class of locks having said indicia;

(g) causing said multiplicity of special locks including said sub-type having different sizes, different manufacturing designs and styles, and different methods of locking and unlocking by airline travelers to be distributed to a multiplicity of air travelers for locking luggage by locking said first lock portion, said distributing comprising conveying to the air travelers that the special lock will be subjected by the screening authority to a special screening procedure;

(h) applying said special locks to air travelers' luggage to secure the luggage against opening without cutting or breaking, the special locks or the luggage.

2. The method of claim 1 in which said providing the class of special locks comprises providing in said class both special locks having a mechanical second lock portion and special locks having an electronic second lock portion.

3. The method of claim 2 in which said supplying the screening authority with at least one master key comprises supplying at least one mechanical master key configured to open and re-lock a plurality of the special locks in said class that comprise a mechanical second lock portion and at least one electronic master key configured to open and re-lock a plurality of the special locks in said class of special locks that comprise an electronic second lock portion.

4. A method of improving security of luggage of airline travelers through the use of a class of locks with which airline travelers can secure their luggage, said class comprising a multiplicity of special locks that differ from each other but a luggage screening authority for airline luggage can open and re-lock with a single configuration of a master key without cutting the locks, said multiplicity of special locks including sub- types having different sizes, different manufacturing designs and styles, and different methods of locking and unlocking by airline travelers, said special locks including first portions configured to be locked and unlocked by air travelers and second portion configured to be unlocked by the luggage screening authority with the master key to thereby open the special locks without cutting or breaking them, said method comprising:

(a) causing the providing to air travelers of a class of said special locks for airline travelers luggage;

(b) entering into an agreement with the luggage screening authority that the authority will maintain the master key to unlock the special locks therewith during luggage screening of said luggage, using said master key to unlock the second portions of said special locks and thus the special locks;

(c) wherein:
(i) said class of special locks includes locks that differ from each other in size, manufacturing design and style, and method of locking and unlocking by the airline travelers;

(ii) each of the locks in said class of special locks comprises special indicia configured to remain a part of the lock while the lock is securing said luggage, and to remain visible and conspicuous even when the first portion of the lock is and remains locked to secure the luggage;

(iii) said indicia (1) conveying to the luggage screening authority that the lock is in said class of special locks that the luggage screening authority would open and re-lock for screening luggage without cutting the lock, and (2) conveying to air travelers that the lock is in said class of locks that the screening authority would open and re-lock without cutting the lock;

(iv) said special indicia are in addition to any name on the lock of a manufacturer or a seller of the lock;

(v) each of the locks in said class of special locks comprises at least one of said first lock portions, each first lock portion being operable multiple times by an airline traveler to lock the traveler's luggage with the lock and thereafter to open the lock;

(vi) the first lock portions including combination locks and as well as locks with other lock mechanisms within said class of special locks; and (vii) each lock in said class of special locks further comprises at least one of said second lock portions, each second lock portion being operable by the screening authority but not the air traveler to repeatedly open and re-lock the lock without cutting the lock even when the first portion of the lock is and remains locked;

(d) causing said multiplicity of special locks including said sub-type having different sizes, different manufacturing designs and styles, and different methods of locking and unlocking by airline travelers to be distributed to a multiplicity of air travelers for locking luggage by locking said first lock portion, said distributing comprising conveying to the air travelers that the special lock will be subjected by the screening authority to a special screening procedure;

(e) supplying the screening authority with at least one master key configured to open each lock of said multiplicity of special locks including said sub-type having different sizes, different manufacturing designs and styles, and different methods of locking and unlocking by airline travelers;

(f) said at least one master key being configured to repeatedly open and re-lock each of a plurality of the locks in said class of locks while the first portion of the lock is and remains locked when the screening authority subjects the travelers' luggage to said special screening procedure; and (g) said master key configuration being associated with said class of locks having said indicia.

(h) using the master key by the luggage screening authority in accordance with the agreement to open said second portions of the special locks, and thus the special locks, during luggage screening of said luggage without cutting or breaking the special locks or the luggage.

5. The method of claim 4 in which said providing the class of special locks comprises providing in said class both special locks having a mechanical second lock portion and special locks having an electronic second lock portion.

6. The method of claim 5 in which said supplying the screening authority with at least one master key comprises supplying at least one mechanical master key configured to open and re-lock a plurality of the special locks in said class that comprise a mechanical second lock portion and at least one electronic master key configured to open and re-lock a plurality of the special locks in said class of special locks that comprise an electronic second lock portion.

* * * * *